DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 4, 1975

932 O.G. 10

T932,004

AROMATIC POLYCARBONATES

Ronald George Feasey, Knebworth, and John Leslie Freeman, Huntingdon, England, assignors to Imperial Chemical Industries Limited, London, England

Continuation-in-part of application Ser. No. 252,555, May 12, 1972. This application Dec. 17, 1973, Ser. No. 425,282

Int. Cl. C08g *17/13*

U.S. Cl. 260—47 XA

No Drawing. 12 Pages Specification

A polymer is provided having recurring units of the formula

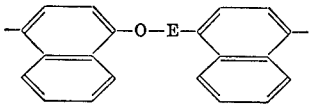

where E is preferably a direct link or may be a group having the formula —X—O— where X is a ketone or divalent polymethylene group.